United States Patent [19]

Hirschman et al.

[11] 4,245,308

[45] Jan. 13, 1981

[54] INTELLIGENT DATA PROCESSING TERMINAL HAVING AN INTERLOCK SYSTEM

[75] Inventors: Joel A. Hirschman, San Jose, Calif.; Rojer J. Llewelyn, Winchester; Anthony H. Rogers, Romsey, both of England

[73] Assignee: International Business Machines Corporation, Armonk, N.Y.

[21] Appl. No.: 78,760

[22] Filed: Sep. 25, 1979

[30] Foreign Application Priority Data

Oct. 2, 1978 [GB] United Kingdom ............... 39002/78

[51] Int. Cl.³ .......................... G06F 9/46; G06F 3/02
[52] U.S. Cl. ..................................... 364/200; 371/53
[58] Field of Search ........................ 364/200; 371/53

[56] References Cited

U.S. PATENT DOCUMENTS

| | | | |
|---|---|---|---|
| 3,375,499 | 3/1968 | Ghiron et al. | 364/900 |
| 3,955,180 | 5/1976 | Hirtle | 364/200 |
| 3,997,875 | 12/1976 | Broeren | 364/200 |
| 4,195,344 | 3/1980 | Yamazaki | 364/200 |
| 4,200,913 | 4/1980 | Kuhar et al. | 364/900 |

OTHER PUBLICATIONS

Andrews et al. "Upper/Lower Case & Keyboard Redefine Feature for Word Processor & Electronic Keyboard Character Translation Redefinition" *IBM Tech. Discl. Bulletin*, vol. 19, No. 8, 1-'77, pp. 2853-2855.
Quinlivan "On-board Backup Supply Protects Volatile RAM Data" *EDN Magazine*, vol. 23, No. 7, Apr. '78, pp. 120-122.
"User-Programmable Display Terminals Adapt to Special Needs" *Computer Design*, vol. 17, No. 5, May '78, pp. 36-38.

*Primary Examiner*—David H. Malzahn
*Attorney, Agent, or Firm*—J. Jancin, Jr.; F. D. Poag; M. S. Bigel

[57] ABSTRACT

A set-up store is added to an intelligent data processing terminal for storage of terminal characterizing information therein. Terminal characterizing information includes a representation of installed terminal features and a representation of selected terminal options. The information is changeable by the operator to indicate new installed features or different selectable options.

A system of interlocks safeguards against improper operator actions, as follows: An interlock prevents the entry of inaccurate terminal characterizing information. Another interlock disables normal terminal operation if terminal characterization information is not present in the set-up store. A security lock prevents unauthorized entry of terminal-characterizing information. An interlock disables operation of language-unique keyboard keys until a keyboard language has been entered. Another interlock prevents the selection of terminal options unless the installed terminal features are present in the set-up store.

8 Claims, 8 Drawing Figures

INTELLIGENT DATA PROCESSING TERMINAL HAVING AN INTERLOCK SYSTEM

DESCRIPTION

1. Technical Field

This invention relates to intelligent data processing terminals generally, and more specifically, to an intelligent data processing terminal having an interlock system.

2. Background Art

Data processing terminals are becoming increasingly popular for communication between an operator and a data processor. A data processing terminal commonly consists of a keyboard and a display device. Early terminals were relatively simple and relied upon the host data processor for controlling terminal operation. Recently, intelligent terminals have been developed, in which less reliance is placed on the host data processor for terminal control. Intelligent terminals contain a terminal controller within the terminal itself. This terminal controller may be in the form of a microprocessor.

The presence of a terminal controller within the terminal allows the terminal to be configured according to the particular needs of the operator. For example, various features, such as a printer, a selector pen or an increased capacity memory may be installed as part of the terminal. Terminal options, e.g., screen size (the number of characters displayed) or the type of communications protocol may be selected.

The configuration of the terminal may be indicated to the terminal controller by storage of terminal characterizing information in a non-volatile store within the terminal. When the terminal is off, this information is retained in the non-volatile store. When the terminal is on, the terminal controller controls the operation of the terminal in accordance with the terminal characterizing information. This information may be modified by the operator by entering new characterizing information to indicate a new terminal configuration.

DISCLOSURE OF INVENTION

The provision for operator modification of terminal characterizing information increases the intelligent terminal's versatility. However, this increased versatility leaves more room for improper operator actions. It is an object of this invention to provide an interlock system for safeguarding against improper operator actions generally, and the following improper operator actions specifically:

1. Inaccurate entry of terminal characterizing information.

2. Unauthorized entry of terminal characterizing information.

3. Operation of the terminal with no terminal characterizing information present in the terminal's non-volatile store.

4. Selection of terminal options (e.g., screen size or communications protocol, etc.) before the installed terminal features (e.g., a selector pen, added memory, printer, etc.) are entered in the terminal's non-volatile store.

5. Use of the terminal keyboard without first indicating the keyboard language, e.g., French, German, etc.

The intelligent terminal of the present invention comprises a microprocessor terminal controller, a keyboard and a display device. A non-volatile set-up store is connected to the terminal controller. The set-up store consists of a small battery powered random access memory. Terminal characterizing information is stored in the set-up store. This terminal characterizing information includes a representation of installed terminal features and a repesentation of selected terminal options.

Inaccurate entry of terminal characterizing information is prevented by requiring entry of a check digit along with the digit string representing installed terminal features. This check digit is calculable from the digit string by a predetermined formula. If the entered check digit does not equal the calculated check digit, the entered digit string will not be stored in the set-up store.

Unauthorized entry of terminal characterizing information is prevented by providing a security lock. The operation of the terminal for entry of the representation of installed terminal features, is disabled, unless the security lock is first operated.

Operation of the terminal with no terminal characterizing information present in the set-up store is prevented by automatically configuring the terminal for entry of a representation of installed terminal features, if the terminal is configured for entry of characterizing information and the representation of installed terminal features is not present in the set-up store. If the terminal is configured for normal data processor communication and the representation of installed terminal features is not present in the set-up store, an error message is displayed.

Selection of terminal options before the installed terminal features are entered in the set-up store is prevented by preventing configuration of the terminal for storing selected terminal options unless the installed terminal features have been previously stored in the set-up store.

Use of the keyboard without first indicating the keyboard language is prevented by requiring the storage of a keyboard language indicator in the set-up store. The keyboard language indicator is entered by means of a group of keys present on every keyboard regardless of the keyboard language. The operation of all language-unique keys is disabled until the keyboard language indicator has been entered.

BEST MODE FOR CARRYING OUT THE INVENTION

Figure 1:
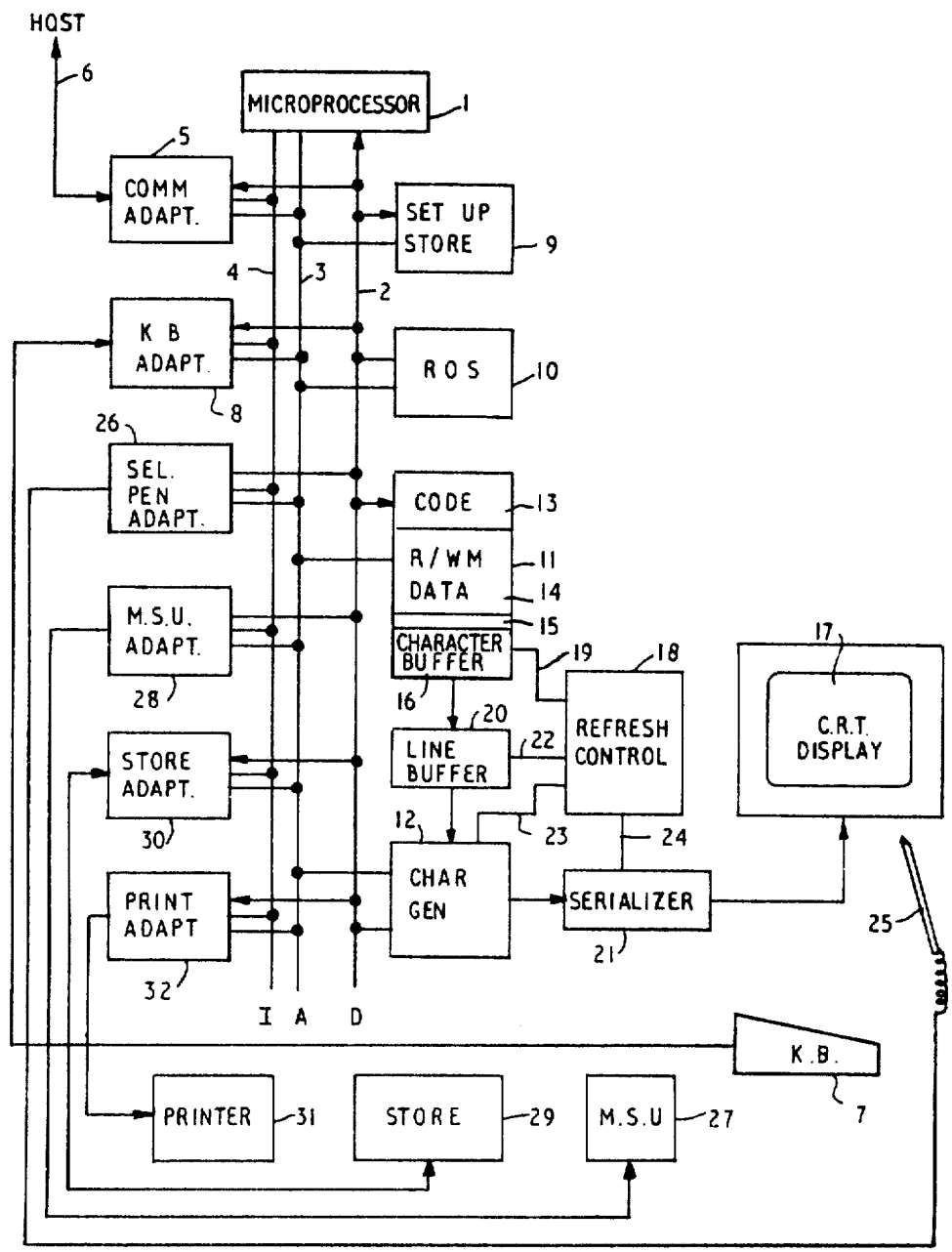
FIG. 1 is a block diagram of a data processing terminal embodying the present invention.

A data processing terminal (see FIG. 1) includes a microprocessor terminal controller 1 having a data bus 2, an address bus 3, and an interrupt line 4. Typically, the microprocessor terminal controller 1 may operate on 8-bit data bytes, the data bus 2 being 8 bits wide and the address bus 3 being 16 bits wide. The microprocessor terminal controller 1 can thus communicate with up to $2^{16}$ locations, transferring one byte of data at a time along the data bus 2. Connected to the busses 2 and 3 is a communications adapter 5 through which the terminal can communicate with a host data processor (not shown) via a communications link 6. The adapter 5 serializes and deserializes data streams to and from the host processor and performs bit stuffing/unstuffing, flag recognition and block check code validation in accordance with the particular communication line protocol employed. A limited number of data bytes can be buffered within the adapter 5 which can also subject inbound and outbound data streams to data compaction to allow efficient use of the communication link 6.

A keyboard 7 is connected to the data and address busses 2 and 3 through a keyboard adapter 8 so that the scan code (which represents the particular key operated at the keyboard 7) can be passed to the microprocessor 1. The keyboard 7 incorporates a number of function keys as well as alphanumeric keys.

Also attached to the data and address busses 2 and 3 are a set-up store 9, a read only store 10, a random access or read/write memory 11, and a character generator 12. The set-up store 9 contains terminal characterizing information and will be described in more detail below. The read only store 10 contains basic microcode for controlling the operation of the microprocessor. Random access memory 11 is divided into sections 13, 14, 15 and 16. Section 13 is used for storing additional microcode which can be loaded from the host processor via adapter 5 and microprocessor 1. The size of section 13 will depend on the particular features installed in the terminal. The amount of microcode contained therein will depend upon the particular application in use.

Section 14 of random access memory 11, which will also vary in size in accordance with the installed features, stores data received from or to be sent to the host processor. Character data bytes within section 14 which are to be displayed on a raster scanned cathode ray tube display 17 can be transferred to section 16 which constitutes a character buffer. An indicator row containing messages to the operator to be displayed on the CRT display 17 is contained within section 15 of random access memory 11.

The character generator 12 is preferably a random access memory so that the bit patterns associated with different character sets can be loaded into it by the microprocessor 1. However, it is within the scope of the present invention for the character generator to be a read only store in which case it would not be connected to the data and address busses 2 and 3.

Because the cathode ray tube needs to be refreshed with data to be displayed thereon, refresh control 18 addresses the character buffer 16 via line 19 and loads lines of character bytes therein line by line into a line buffer 20. Each line of character bytes in the line buffer 20 in turn addresses the character generator 12 to derive the bit pattern necessary to display that line of characters on the CRT screen 17. The bit patterns are applied to a serializer 21 which supplies video data to the display 17. Synchronization of the character buffer 16, line buffer 20, character generator 12 and serializer 21 is maintained by control lines 19, 22, 23 and 24 respectively. The refresh hardware will not be described in more detail because such hardware is well known to those skilled in the art and is not part of the present invention.

It will be appreciated that the invention is not limited to the use of a refreshed display but may employ a display which does not need refresh, for example, a plasma gas panel display.

As well as the input/output devices already described, other input/output devices may also be connected to the data and address busses 2 and 3. Thus, for example, a selector pen 25 connected to a selector pen adapter 26, a magnetic slot reader unit 27 connected to a magnetic slot unit adapter 28, a data store 29 connected to storage adapter 30, and a local printer 31 connected to printer adapter 32 may all be interfaced with the busses 2 and 3. Magnetic slot reader 27 allows a complete screen to be filled with data by reading phase encoded data on a magnetic recording strip. Store 29 may be magnetic cassette or diskette store, and local printer 31 may be any convenient serial printer. The adapters generally will buffer, encode and otherwise manipulate data transmitted to or from their attached devices.

When an input/output device requires service from the microprocessor controller 1, it will raise an interrupt on line 4. In accordance with the assigned priority level, the microprocessor 1 will then receive or transmit data from or to the interrupting device.

It will be apparent from the above description that the terminal can have many different combinations of features. For example, the amount of read only store and random access storage, and the number and type of input/output devices, can vary considerably. There is a need for technical characterizing information to be stored within the terminal. This is the purpose of set-up store 9 which will now be described in more detail. The characterizing information falls into three categories:

1. Information relating to the installed terminal features such as the amount of extra storage, I/O devices, and the identification number of the terminal.

2. Options selectable by the operator to connect the terminal to the communication network, for example, the synchronous data link control address of the terminal, and mode of teleprocessing operation.

3. Information relating to other operator selectable options, for example, screen capacity, microcode load features, and selected variations in teleprocessing operation due to network problems such as switched network back up and half speed teleprocessing operation.

Figure 2:
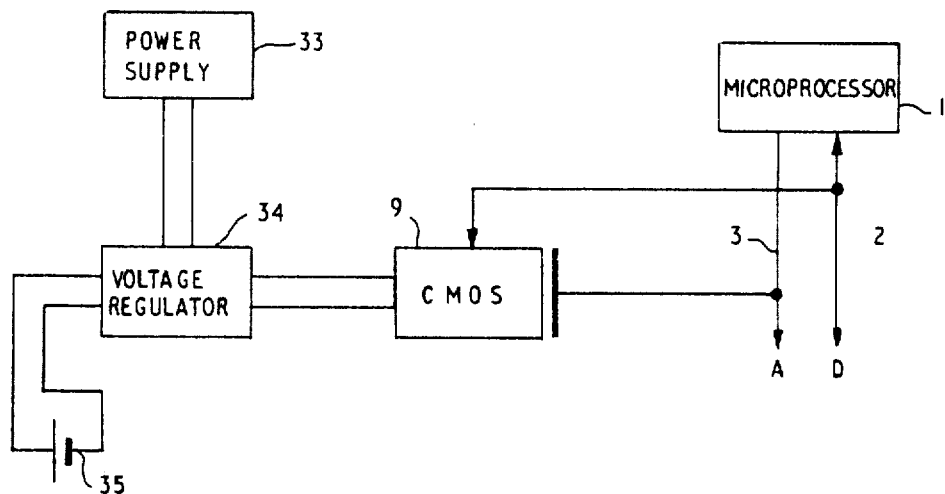
FIG. 2 illustrates how a CMOS store is powered within the terminal of FIG. 1.

This characterizing information is stored in the set-up store 9 and is accessible to the microprocessor controller 1. This information should be retained in the store 9 of the terminal when the power is switched off. To this end, in a preferred embodiment of the invention, it is contained in a small (256×4 bit) CMOS random access memory as shown in FIG. 2. The CMOS memory has the characteristic that data can be retained at a standby voltage of 2 V which is lower than the normal operating voltage of 5 V with a very low current consumption of 10 μA.

As shown in FIG. 2, CMOS 9 is supplied with power from a power supply 33 through a voltage regulator 34. Should the power supply 33 be switched off or fail, the voltage regulator 34 will supply power from battery 35 to retain data stored within the CMOS memory 9. If the battery 35 is a standard memory cell battery, the power-off retention time can be in excess of 3½ years. Details of the voltage regulator 34 are not given but an example of a switching regulator is described in the IBM Technical Disclosure Bulletin, Vol. 18, No. 12, May 1976, at pages 4147-4149.

Should the battery 35 become defective, data within the CMOS memory 9 will be lost. Provision is therefore necessary to allow the data to be reentered into the memory 9. In addition, when the terminal is first installed, some means must be provided to allow the characterizing information to be entered into the set-up store 9. This is done using a sequence which will be described below.

The characterizing information could be stored in a read only store which is inherently non-volatile. Some flexibility of the terminal configuration could be provided for by allowing the operator who is configuring the terminal to access different sections of the read only store. However, the use of a read only store would pose some limitation as to how many features could be added to the terminal after installation. It is therefore preferred that the set-up store be writable even if it is built from inherently non-volatile storage. Thus, instead of using CMOS as described, the set-up store 9 could be built from a magnetic bubble memory or from an electrically-alterable semiconductor read only store in which data is retained by the storage of charge within an insulating layer on the surface of the semiconductor store should power fail.

Figure 3:
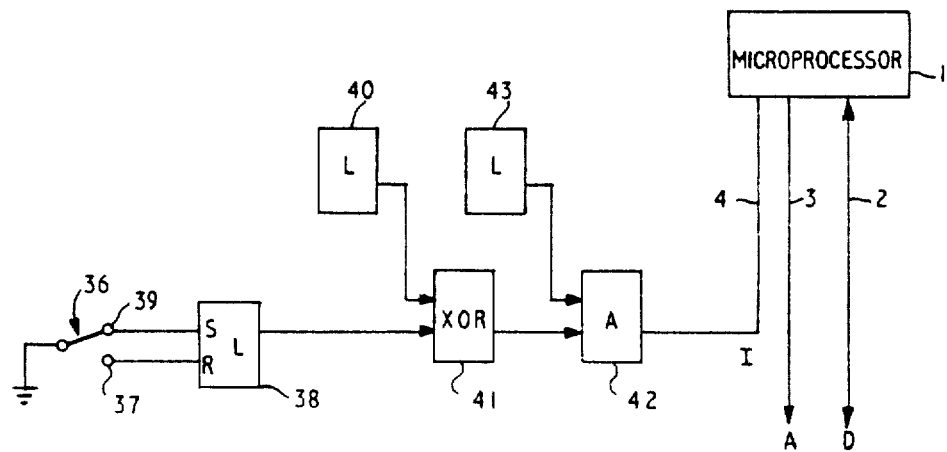
FIG. 3 is a block diagram showing how a run/set up switch raises an interrupt to a microprocessor.

For the following loading sequence, let us assume that the terminal is being powered-on for the first time and that there is no terminal characterizing information within the set-up store 9. Power is switched on with a mode selection switch 36, FIGS. 3 and 8, set in the SET UP position. Mode selection switch 36 is connected to contact 37, FIG. 2. As an alternative to switch 36, a key or keys on the keyboard could be used. When the mode switch is set to contact 37, this resets a latch 38 which serves as an anticontact-bounce latch. With the switch in position 39, that is in RUN mode, latch 38 is set. Latch 40 is controllable by the microprocessor 1 and specifies the state of the switch 36 which will cause an interrupt to the microprocessor 1. The outputs of latches 38 and 40 are supplied to an EXCLUSIVE OR gate 41 whose output is supplied to an AND gate 42. Latch 43 is controllable by the microprocessor 1 and acts as an interrupt mask. The output of the latch 43 gates the interrupt pulse from EXCLUSIVE OR gate 41 through AND gate 42 to the interrupt line of the microprocessor.

Figure 8:
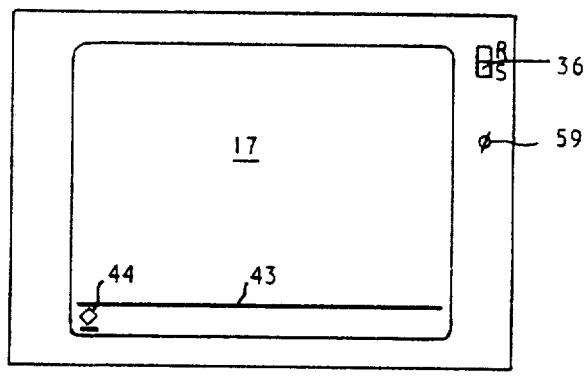
FIG. 8 illustrates the position of the indicator row on the display.

Microprocessor controller 1 recognizes that switch 36 is in SET UP mode and that there is no terminal-characterizing information in the set-up store 9. Under microprogram control by microcode stored in ROS 10, FIG. 1, microprocessor controller 1 loads the indicator row section 15 of random access memory 11 with symbol and character bytes representing that the terminal is in TERMINAL SET UP mode. The refresh hardware displays the indicator row on the screen 17. As shown in FIG. 8, the indicator row is beneath a line 43 which separates the indicator row from the character display area of the screen.

Figure 4:
FIGS. 4-7 show the appearance of an indicator row on the display of the terminal of FIG. 1.

FIG. 4 shows the first message on the screen. This message consists of a diamond-shaped ALTER mode symbol 44 and a string of characters ABC . . . H . . . which represent the various keyboard languages such as Austrian/German, French (QWERTY), French (AZERTY), UK English, American English, etc. In all, there may be some 25 or more different keyboard languages which can be used on the keyboard 7 supplied with the terminal. The operator places the cursor 45 under the particular character representing the language on the installed keyboard, using the cursor left or right movement keys, and selects that character by keying the CURSOR SELECT function key (not shown) on the keyboard.

It is an important feature of the preferred embodiment of this invention that this action in TERMINAL SET UP mode is performed on keys which are common to all the different language keyboards. In other words, only those keys are used which produce the same symbols and same scan codes whatever the language.

Figure 5:
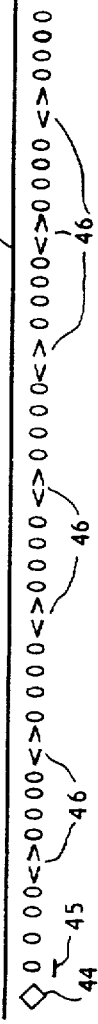

When the correct character has been selected, a set of characters representing the set-up string is displayed in the indicator row as shown in FIG. 5. The ALTER mode symbol 44 is displayed and the 32 characters in the string are displayed in groups of four separated by separator symbols 46. Separator symbols 46 reduce operator keying errors by making it easier to determine where the operator is within the string. Each character position represents a hexadecimal digit in the range 0-9, A-F.

Different digits represent different installed terminal features. As an example of the representation of an installed terminal feature, the first 5 digits may represent the terminal ID derived from its serial number. This terminal ID is unique to that terminal and is required for the IBM Systems Network Architecture (SNA) communications protocol. Other digits in the string may represent other terminal features such as information relating to the type of character generator installed, for example, whether it includes APL (A Programming Language) symbols. Still other digits in the string may represent terminal features such as whether input/output devices, e.g., a selector pen, magnetic slot reader, local printer, local external storage, or internal communications modes, are installed. Finally, other digits may identify which type and the amount of read only store 10 and random access memory 11 and its divisions installed on that terminal, and whether the terminal has a numeric lock feature or security key fitted.

The operator is supplied with the hexadecimal digit string to be entered during TERMINAL SET UP mode. If the set-up store is empty on power on, as was the case assumed above, all the displayed digits will be 0. The operator enters the appropriate digit by placing the cursor under the appropriate character position, keying the appropriate hexadecimal characters, and keying the CURSOR SELECT KEY.

Characters are entered in all 32 digit positions including the last which is a check digit. This check digit can be generated in any suitable manner and helps to insure that the correct set-up string was entered. For example, the check digit may be generated by: (a) adding all the odd digits; (b) shift left rotating all the even digits except the check digit and add; (c) adding the results of (a) and (b); and (d) taking the least significant digit.

If the check digits (entered and calculated) match, the set up string will be stored in the set-up store when the CURSOR SELECT key is operated. If the incorrect string has been keyed, the display will revert to all "0's."

An important advantage is the ability to change the set up string should an additional or different feature be installed on the terminal; in this case, a new set up string would be supplied to the operator for entry into the set-up store. Certain of the digits in the string can be reserved for future features which are not available when the terminal is purchased. Each time features are changed or added, the set up string will need to be re-entered with a new check digit.

The TERMINAL SET UP mode described above is a sub-mode of ALTER mode. It was entered automatically because the microprocessor 1 recognized at power on that the terminal set-up string was missing from the set-up store 9. If the terminal had been powered up with a missing set-up string but with the switch 36 set to RUN, an error message would be indicated on the screen until the operator switched over to SET UP mode when the terminal would then be in TERMINAL SET UP mode. If the switch were set to SET UP when the terminal is switched on with the terminal set up string present in the set-up store 9, the terminal is placed in ALTER mode and the ALTER mode symbol 44 is displayed in the indicator row on the screen as shown in FIG. 8. By keying the character "3" after the symbol 44 and then the CURSOR SELECT key, the terminal would be placed in TERMINAL SET UP mode.

Figure 6:
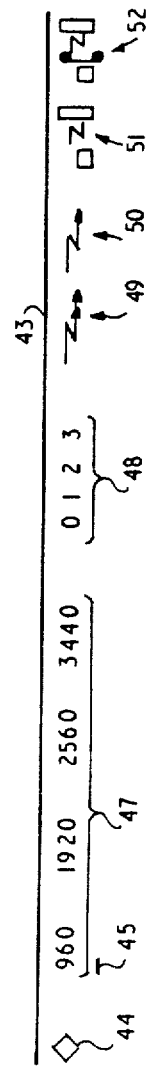

Another sub-mode of ALTER mode is ATTACHMENT BACK UP mode. This is entered from ALTER mode by keying the character "1" after the ALTER mode symbol 44 on the screen and then keying the CURSOR SELECT key. This causes the options shown in FIG. 6 to be displayed on the screen in the indicator row.

Options 47 represent the desired screen size and options 48 represent microcode load features. Options 49 and 50 give a choice between primary teleprocessing speed and secondary teleprocessing speed, respectively. Options 51 and 52 give a choice between SNBU (Switched Network Back-Up)-off and SNBU-on, respectively. Options are selected by placing the cursor 45 under the appropriate option and keying the CURSOR SELECT key. Selected options can be highlighted from nonselected options by displaying them flashing, for example.

Figure 7:
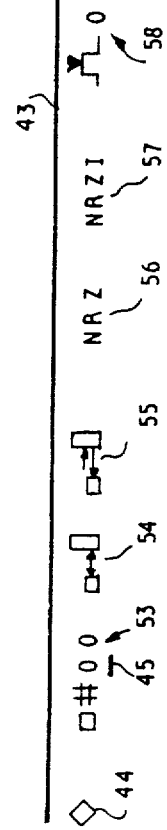

The operator can proceed from ATTACHMENT BACK UP mode by switching mode switch 36 to RUN to place the terminal in RUN mode or to ALTER mode by positioning the cursor under the ALTER mode symbol 44 and keying the CURSOR SELECT key. A third sub-mode of ALTER mode is ATTACHMENT SET UP mode. This is reached from ALTER mode by keying the character "2" after the symbol 44 and then keying the CURSOR SELECT key. This will cause the options shown in FIG. 7 to be displayed in the indicator row on the screen. Field 53 represents the Synchronous Data Link Control address and allows the operator to enter a customer-specified address. If the keyed digits are outside the hexadecimal range, the old address will be displayed. Options 54 and 55 represent 2-wire (switched carrier) or 4-wire (continuous carrier) protocols respectively. Options 56 and 57 give a choice between NRZ (non-return to zero) and NRZI (non-return to zero inverted) protocols, respectively. Finally, field 58 allows the operator to change the transmit level of the integrated modem within the terminal (if installed). The terminal can be returned to ALTER mode by positioning the cursor under the symbol 44 and keying the CURSOR SELECT key.

While in ALTER mode, if any character other than "1," "2" or "3" is keyed, the terminal will remain in ALTER mode when the CURSOR SELECT key is operated. RUN mode, which is the normal operating mode of the terminal, can be reached from ALTER mode or any of its sub-modes by operating the mode switch 36 provided that terminal characterization data is contained within the set-up store 9.

Table I is a flow chart in tabular form representing the various sequences which have been described above.

If the terminal is supplied with a set-up security lock 59 as indicated in FIG. 8, the microprocessor 1 will make a security check while the terminal is in ALTER mode before allowing the terminal to be placed in ATTACHMENT or TERMINAL SET UP modes. If the lock is enabled, the terminal will be placed in the selected SET UP mode: if the lock is disabled, the keyboard will be locked to prevent change of information within the set-up store 9.

To aid in ensuring that only correct data is entered by the operator into the set-up store 9, the different fields of the set up string and the displayed options can be subjected to cyclic redundancy code check or longitudinal parity check. This check can also be performed when the terminal is powered up to ensure the validity of data read from the store 9 by the microprocessor 1.

Table II is a flow chart in tabular form representing the above-described action taken by the microprocessor 1 on power on of the terminal.

TABLE I

| STEP | COMMENT |
|---|---|
| 1 | Operator switches to RUN mode |
| 2 | Terminal in RUN mode |
| 3 | Operator switches to SET UP mode |
| 4 | Terminal in ALTER mode |
| 5 | Operator performs STEP 1, 6, 14, 19 or 24 |
| 6 | Operator keys in "3" and CURSOR SELECT |
| 7 | Terminal in TERMINAL SET UP mode |
| 8 | Operator performs STEP 1, 9 or 11 |
| 9 | Operator makes selection and/or enters set up data |
| 10 | Operator performs STEP 8 |
| 11 | Operator positions cursor under ALTER symbol and keys CURSOR SELECT |
| 12 | Terminal in ALTER mode |
| 13 | Operator performs STEP 5 |
| 14 | Operator keys in "2" and CURSOR SELECT |
| 15 | Terminal in ATTACHMENT SET UP mode |
| 16 | Operator performs STEP 8 |
| 17 | Terminal in ALTER mode |
| 18 | Operator performs STEP 5 |
| 19 | Operator keys in "1" and CURSOR SELECT |
| 20 | Terminal in ATTACHMENT BACK UP mode |
| 21 | Operator performs STEP 8 |
| 22 | Terminal in ALTER mode |
| 23 | Operator performs STEP 5 |
| 24 | Operator keys CURSOR SELECT or "other key" and CURSOR SELECT |
| 25 | Terminal in ALTER mode |
| 26 | Operator performs STEP 5 |

TABLE II

| STEP | COMMENT |
|---|---|
| 1 | Power On |
| 2 | If switch in RUN MODE go to 3; if not go to 8 |
| 3 | If CMOS good go to 4; if not go to 6 |
| 4 | Initialize display |
| 5 | Display in RUN mode |
| 6 | Error, operator switches to SET UP mode |
| 7 | Display in TERMINAL SET UP mode (see FIGS. 4 and 5) |
| 8 | If CMOS good go to 9; if not go to 7 |
| 9 | Initialize display |
| 10 | Display in ALTER mode (to allow STEP 5, Table I) |

The invention has been described with reference to a flexible data processing terminal in which installed terminal features may be indicated and options selected by the operator. It could also applied to other data terminals in which similar characterizing information is required: in this event, the display need only be sufficient to display the various options for operator selection, etc., and the keyboard need not be a full alphanumeric keyboard but could be a keyboard having a limited number of keys.

What is claimed is:

1. In a data processing system including a data processor, a data processing terminal for communicating with said data processor, comprising:
   a set-up store for storing therein terminal-characterizing information including a keyboard language indicator;
   a keyboard including a first set of keys for storing said keyboard language indicator in said set-up store and a second set of keys for communicating with said data processor in the keyboard language; and
   a terminal controller connected to said set-up store and said keyboard for controlling the operation of said terminal comprising:
      means for detecting the absence of said keyboard language indicator in said set-up store,
      means for enabling operation of said first set of keys consequent upon said detecting means detecting the absence of said keyboard language indicator in said set-up store; and
      means for disabling operation of said second set of keys to thereby disable communication with said data processor, consequent upon said detecting means detecting the absence of said keyboard language indicator in said set-up store.

2. The data processing terminal of claim 1 wherein said first set of keys includes a first set of symbols which are independent of said keyboard language, and said second set of keys includes a second set of symbols which vary with said keyboard language.

3. A data processing terminal comprising:
   a set-up store for storing therein terminal-characterizing information, including a representation of installed terminal features and a representation of selected terminal options,
   means for configuring said terminal to store said representation of selected terminal options in said set-up store; and
   a terminal controller connected to said set-up store and said configuring means for controlling the operation of said terminal comprising:
      means for detecting the absence of said representation of installed terminal features in said set-up store; and
      means for disabling said configuring means consequent upon said detecting means detecting the absence of said representation of installed terminal features in said set-up store to thereby prevent the storing of said representation of selected terminal options in said set-up store.

4. A data processing terminal comprising:
   a set-up store for storing therein terminal characterizing information including a representation of installed terminal features;
   a terminal controller connected to said set-up store for controlling the operation of said terminal; and
   means for entering a string of digits into said terminal controller, said string including said representation of installed terminal features and an entered check digit which is calculable from said representation of installed terminal features in accordance with a predetermined formula;
   said terminal controller comprising:
      means for calculating a calculated check digit from said representation of installed terminal features in accordance with the aforesaid predetermined formula,
      means for comparing said calculated check digit with said entered check digit,
      means for storing said representation of installed terminal features in said set-up store consequent upon said calculated check digit and said entered check digit being equal; and
      means for preventing the storing of said representation of installed terminal features in said set-up store consequent upon said calculated check digit and said entered check digit being unequal.

5. A data processing terminal comprising:
   a set-up store for storing therein terminal characterizing information including a representation of installed terminal features;
   first means for configuring said terminal to store said terminal characterizing information in said set-up store;
   a terminal controller connected to said set-up store and said first configuring means for controlling the operation of said terminal comprising:
      first means for detecting the operation of said first configuring means;
      second means for detecting the absence of said representation of installed terminal features in said set-up store; and
      second means for configuring said terminal to store said representation of installed terminal features in said set-up store consequent upon (1) said second detecting means detecting the absence of said representation of installed features in said set-up store, and (2) said first detecting means detecting the operation of said first configuring means, to thereby automatically configure said terminal as aforesaid.

6. A data processing terminal comprising: a display device;
   a set-up store for storing therein terminal characterizing information including a representation of installed terminal features;
   means for configuring said terminal in accordance with a predetermined configuration to store said terminal characterizing information in said set-up store;
   a terminal controller connected to said display device, said set-up store and said configuring means for controlling the operation of said terminal comprising:
      first means for detecting the presence or absence of the predetermined configuration in said first configuring means;
      second means for detecting the absence of said representation of installed terminal features in said set-up store; and
      means for displaying an error message on said display device consequent upon (1) said second detecting means detecting the absence of said representation of installed terminal features in said set-up store, and (2) said first detecting means detecting the absence of the predetermined configuration in said configuring means to thereby display an error message if said terminal is not configured to store said terminal characterizing information in said set-up store and said representation of installed terminal features is not present in said set-up store.

7. A data processing terminal comprising:
   a display device;

a set-up store for storing therein terminal characterizing information including a representation of installed terminal features;

first means for configuring said terminal in accordance with a predetermined configuration to store said terminal characterizing information in said set-up store;

a terminal controller connected to said set-up store and said first configuring means for controlling the operation of said terminal comprising:

first means for detecting the presence or absence of the predetermined configuration in said first configuring means;

second means for detecting the absence of said representation of installed terminal features in said set-up store;

second means for configuring said terminal to store said representation of installed terminal features in said set-up store consequent upon (1) said second detecting means detecting the absence of said representation of installed features in said set-up store, and (2) said first detecting means detecting the presence of said predetermined configuration to thereby automatically configure said terminal as aforesaid, and means for displaying an error message on said display device consequent upon (1) said second detecting means detecting the absence of said representation of installed terminal features in said set-up store, and (2) said first detecting means detecting the absence of the predetermined configuration in said first configuring means to thereby display an error message if said terminal is not configured to store said terminal characterizing information in said set-up store and said representation of installed terminal features is not present in said set-up store.

8. A data processing terminal comprising:

a set-up store for storing therein terminal-characterizing information including a representation of installed terminal features, a keyboard, a security lock;

means for configuring said terminal to store said representation of installed terminal features in said set-up store; and a terminal controller connected to said set-up store, said keyboard, said configuring means, and said security lock for controlling the operation of said terminal comprising:

first means for detecting the operation of said configuring means, second means for detecting the disability of said security lock, and means for disabling said keyboard consequent upon (1) said first detecting means detecting the operation of said configuring means and (2) said second detecting means detecting the disability of said security lock to thereby prevent the storing of said representation of installed terminal features in said set-up store.

* * * * *